United States Patent
Lee

(10) Patent No.: US 8,184,320 B2
(45) Date of Patent: May 22, 2012

(54) PRINTING CONTROL APPARATUS TO CONTROL PRINTING OPERATION, PRINTING CONTROL SYSTEM, AND METHODS THEREOF

(75) Inventor: Don-seon Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1106 days.

(21) Appl. No.: 12/046,510

(22) Filed: Mar. 12, 2008

(65) Prior Publication Data

US 2008/0316527 A1 Dec. 25, 2008

(30) Foreign Application Priority Data

Jun. 22, 2007 (KR) ........................ 10-2007-0061746

(51) Int. Cl.
*G06F 3/12* (2006.01)
*H04N 1/40* (2006.01)
*H04N 1/46* (2006.01)
*B41J 2/385* (2006.01)
*G03B 27/52* (2006.01)

(52) U.S. Cl. ....... 358/1.15; 358/448; 358/514; 347/133; 355/30

(58) Field of Classification Search ................ 358/1.13, 358/1.15, 3.09, 3.22, 501, 508, 514, 401, 358/448; D18/36, 41; 347/81, 116, 133; 355/30

See application file for complete search history.

(56) References Cited

U.S. PATENT DOCUMENTS

| 4,284,362 | A | * | 8/1981 | Jackson et al. | ................ | 400/323 |
| 2002/0004802 | A1 | * | 1/2002 | Shima | ........................... | 707/513 |
| 2003/0206547 | A1 | * | 11/2003 | Cho | .............................. | 370/364 |
| 2004/0042806 | A1 | * | 3/2004 | Dougherty et al. | ............. | 399/44 |

FOREIGN PATENT DOCUMENTS

| JP | 2002-304459 | 10/2002 |
| JP | 2005-4462 | 1/2005 |
| KR | 2007-14763 | 2/2007 |

* cited by examiner

*Primary Examiner* — Benny Q Tieu
*Assistant Examiner* — Ngon Nguyen
(74) *Attorney, Agent, or Firm* — Stanzione & Kim, LLP

(57) ABSTRACT

A printing control apparatus to control a printing operation includes a web server connection unit to connect with a web server of a pre-set address and receive environmental information of an area where the printing apparatus is located, and a controller to transmit a printing control signal corresponding to the received environmental information and printing data to a printing apparatus. Accordingly, a transfer voltage is adjusted according to the environmental information of the area where the printing apparatus is located, so that the effect of the environment on the printing quality can be minimized and thus the printing quality can be improved.

12 Claims, 5 Drawing Sheets

PRINTING CONTROL APPARATUS TO CONTROL PRINTING OPERATION, PRINTING CONTROL SYSTEM, AND METHODS THEREOF

CROSS-REFERENCE TO RELATED APPLICATIONS

This application claims priority under 35 U.S.C. §119 (a) from Korean Patent Application No. 10-2007-61746, filed on Jun. 22, 2007, in the Korean Intellectual Property Office, the disclosure of which is incorporated herein by reference in its entirety.

BACKGROUND OF THE INVENTION

1. Field of the Invention

The present general inventive concept relates to a printing control apparatus to control a printing operation, a printing control system and a method thereof. More particularly, the present general inventive concept relates to a printing control apparatus which controls a printing operation according to environmental information on an area where a printing apparatus is located, a printing control system and a method thereof.

2. Description of the Related Art

In general, a printing apparatus, such as a printer and a photocopier, is connected with a printing control apparatus and prints printing data transmitted from the printing control apparatus on printing paper. A developer is transferred onto the printing paper to form an image corresponding to the printing data in a developing operation. More specifically, during the developing operation, the printing paper has a polarity opposite to that of the developer so that the developer is transferred onto the printing paper when the printing paper passes through a transferring unit.

The degree to which the developer is transferred onto the printing paper depends on environmental conditions of the printing apparatus such as a temperature. For example, if the temperature is substantially low, for example, in the winter or in the morning, the developer is not properly transferred, and thus there occurs an uneven image or blurring effect in the image. Also, if the temperature is substantially high, for example, in the summer or at noon, the high temperature causes a part of the developer to harden, and thus a white dot is generated in the printed image. In other words, the developer is not properly transferred onto the printing paper due to the environmental conditions, which results in the deterioration in the printing quality. One solution to address this problem is to use various sensors that are provided in the printing apparatus to sense the environmental conditions and adjust a transfer voltage accordingly. However, this solution increases a manufacturing cost due to the addition of the sensor, and makes it difficult to realize a compact and low price printing apparatus. Therefore, a solution is demanded to more easily obtain information about the environmental conditions of the area where the printing apparatus is located, and to flexibly control the transfer voltage.

SUMMARY OF THE INVENTION

The present general inventive concept provides a printing control apparatus capable of obtaining environmental information on an area where a printing apparatus is located without requiring an additional sensor, and of controlling a printing operation according to the environmental information, thereby improving the printing quality, a printing control system and a method thereof.

Additional aspects and utilities of the present general inventive concept will be set forth in part in the description which follows and, in part, will be obvious from the description, or may be learned by practice of the general inventive concept.

The foregoing and/or other aspects and utilities of the general inventive concept may be achieved by providing a printing control apparatus, including a web server connection unit to connect with a web server of a pre-set address and receive environmental information of an area where the printing apparatus is located, and a controller to transmit a printing control signal corresponding to the received environmental information and printing data to the printing apparatus.

The web server connection unit may connect with the web-server in at least one of cases where a printing signal is received, where a booting is performed, where a printer driver is executed, and where a pre-set time arrives.

The printing control signal may be a transfer voltage control signal of the printing apparatus.

The controller may compare the received environmental information with pre-set environmental information, and if the received environmental information is within an error range of the pre-set environmental information, the controller may transmit a pre-set transfer voltage control signal to the printing apparatus as the transfer voltage control signal.

The controller may compare the received environmental information with pre-set environmental information, and if the received environmental information is not within an error range of the pre-set information, the controller may adjust a pre-set transfer voltage control signal and transmit the adjusted transfer voltage control signal to the printing apparatus as the transfer voltage control signal.

The printing control apparatus may further include a user interface to set a web server address and area information, and a storage unit to store the set web server address and the area information.

The environmental information may be one of temperature information, humidity information, pressure information, and altitude information.

The foregoing and/or other aspects and utilities of the general inventive concept may also be achieved by providing a method for controlling a printing operation of a printing control apparatus which connects with a web server and also connects with a printing apparatus, the method including receiving environmental information of an area where the printing apparatus is located by connecting with a web server of a pre-set address, and controlling a printing operation by transmitting a printing control signal corresponding to the received environmental information and printing data to the printing apparatus.

Receiving environmental information may comprise connecting with the web server in at least one of cases where a printing control signal is received, where a booting is performed, where a printer driver is executed, and where a pre-set time arrives.

The printing control signal may be a transfer voltage control signal of the printing apparatus.

The controlling of the printing operation may include comparing the received environmental information with pre-set environmental information, and if the received environmental information is within an error range of the pre-set environmental information, transmitting a pre-set transfer voltage control signal to the printing apparatus the transfer voltage control signal.

The controlling of the printing operation may include comparing the received environmental information with pre-set environmental information, and if the received environmental information is not within an error range of the pre-set environmental information, adjusting a pre-set transfer voltage control signal and transmitting the adjusted the transfer voltage control signal to the printing apparatus as the transfer voltage control signal.

The receiving of the environmental information may including setting a web server address and area information, and storing the set web server address and the area information.

The environmental information may be one of temperature information, humidity information, pressure information and altitude information.

The foregoing and/or other aspects and utilities of the general inventive concept may also be achieved by providing a printing control system, including a web server, a printing apparatus to perform a printing operation, and a printing control apparatus to receive environmental information about an area where the printing apparatus is located by connecting with a pre-set web server, and to control a printing operation by transmitting a printing control signal corresponding to the received environmental information and printing data to the printing apparatus.

The foregoing and/or other aspects and utilities of the general inventive concept may also be achieved by providing a method of a printing control system, the method including receiving environmental information about an area where the printing apparatus is located by connecting with the web server, and controlling a printing operation of a printing apparatus by transmitting a printing control signal corresponding to the received environmental information and printing data to the printing apparatus.

The foregoing and/or other aspects and utilities of the general inventive concept may also be achieved by providing a printing control system including a printing control apparatus having a controller to select an web server address and area information, to connect with a web server according to the web server address section, to receive environmental information on the area information, and to output printing data and a control signal corresponding the environmental information, and a printing apparatus to receive the printing data and the control signal corresponding to environmental information, and to perform a printing operation to form an image on a printing medium according to the printing data and the control signal

BRIEF DESCRIPTION OF THE DRAWINGS

These and/or other aspects and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
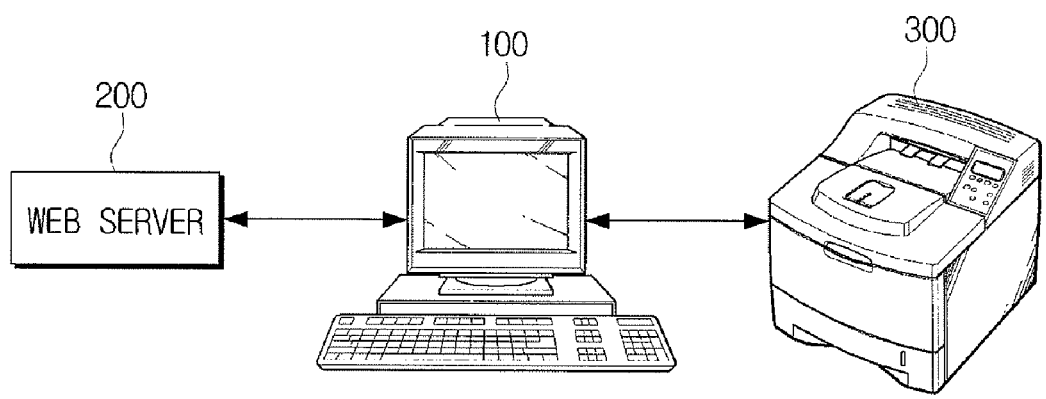
FIG. 1 is a view illustrating a printing control system according to an exemplary embodiment of the present general inventive concept.

Reference will now be made in detail to the embodiments of the present general inventive concept, examples of which are illustrated in the accompanying drawings, wherein like reference numerals refer to the like units throughout. The embodiments are described below in order to explain the present general inventive concept by referring to the figures.

FIG. 1 is view illustrating a printing control system according to an exemplary embodiment of the present general inventive concept. Referring to FIG. 1, the printing control system includes a printing control apparatus 100, a web server 200, and an image forming apparatus, such as a printing apparatus 300.

The printing control apparatus 100 has a plurality of functions, such as functions of generating data using an application, storing data, and retrieving data, and also has a function of controlling a printing operation of the printing apparatus 300. The data may be printing data to be printed in the printing apparatus 300 of the printing control system.

The web server 200 is connected with the printing control apparatus 100 through the Internet. The printing apparatus 300 prints printing data transmitted from the printing control apparatus 100 on printing paper.

Figure 2:
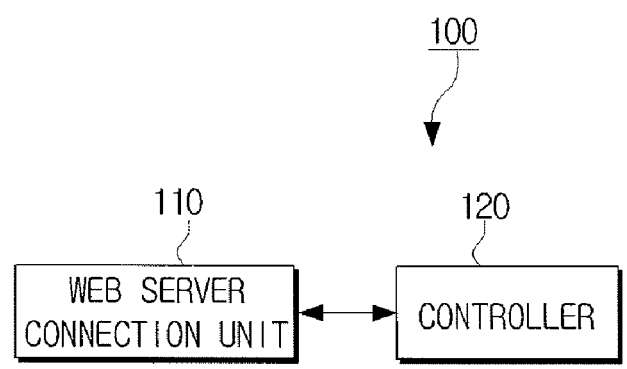
FIG. 2 is a block diagram illustrating a printing control apparatus usable with a printing control system according to an exemplary embodiment of the present general inventive concept.

FIG. 2 is a block diagram illustrating a printing control apparatus usable with a printing control system according to an exemplary embodiment of the present general inventive concept. Referring to FIGS. 1 and 2, the printing control apparatus 100 includes a web server connection unit 110 and a controller 120.

The web server connection unit 110 connects with the web server 200 through the Internet. The web server connection unit 110 uses a uniform resource locator (URL) to connect with the web server 200 through a wired or wireless connection. The web server 200 may be a preset web server. The web server connection unit 110 or the controller 120 may have a preset address corresponding to the web server 200 to connect the controller 120 to the web server 200.

If a printing signal of data generated using an application is received, the controller 120 connects the web server 200 through the web server connection unit 110 and requests environmental information on an area where the printing apparatus 300 is located. Upon the receipt of the environmental information through the web server 200, the controller 120 compares the received environmental information with reference environmental information. More specifically, the environmental information may be one of temperature information, humidity information, pressure information and altitude information. The temperature, humidity, pressure, and altitude are parameters that may affect printing quality during the printing operation of the printing apparatus 300. Therefore, it is necessary to obtain the environmental information through the web server 200 and control the printing operation of the printing apparatus 300 according to the environmental information.

The reference environmental information may be preset environmental information stored in the controller 120 or in a memory connected to the controller 120. The preset environmental information may be selected from a list of one or more sets of environmental information. The environmental information may be information representing a characteristic of the printing operation of the printing apparatus 300. The environmental information may be a variable factor to be supplied to and used in a printing mechanism or circuit of the printing apparatus 300 to form an image on a printing medium. The variable factor may affect the performance or quality of an image formed by the printing mechanism or circuit of the printing apparatus 300.

The controller 120 generates a printing control signal based on the result of comparison of the environmental information obtained through the web server 200 and the pre-set environmental information. The printing control signal is a transfer voltage control signal to control a transfer voltage of a printing unit (e.g., printing mechanism or circuit) of the printing apparatus 300. The controller 120 transmits the printing control signal and the printing data to the printing apparatus 300, and controls such that the printing data is printed according to the printing control signal. Accordingly, the printing control apparatus 100 more easily obtains the information about the area where the printing apparatus 300 is located, without requiring an extra sensor to sense the environmental information. Also, the transfer voltage of the printing apparatus 300 is controlled in consideration of the environmental condition of the area where the printing apparatus 300 is located.

By way of example, the printing control apparatus 100 of the printing control system of FIG. 1 is a computer, and the printing apparatus 300 is a printer. However, other apparatuses known in the art may be adopted. For example, the printing control apparatus 100 may be a mobile phone or PDA which is able to connect with a web server and has a function of controlling the printing apparatus 300, and the printing apparatus 300 may be a photocopier, a facsimile, or a multi-function peripheral which have a printing function. Although the printing control apparatus 100 and the printing apparatus 300 are connected with each other through a local interface as illustrated in FIG. 3, a plurality of printing control apparatuses and a plurality of printing apparatuses are connected with one another through a network interface.

In this embodiment, the printing control apparatus 100 obtains the environmental information through the web server 200 and controls the printing operation of the printing apparatus 300 according to the environmental information. However, it is possible for the printing apparatus 300 to directly obtain the environmental information through the web server 200. More specifically, if the printing apparatus 300 receives a printing signal, the printing apparatus 300 directly connects the web server 200 and obtains the environmental information. According to the environmental information, the printing apparatus 300 adjusts a transfer voltage and performs the printing operation.

Figure 6A:
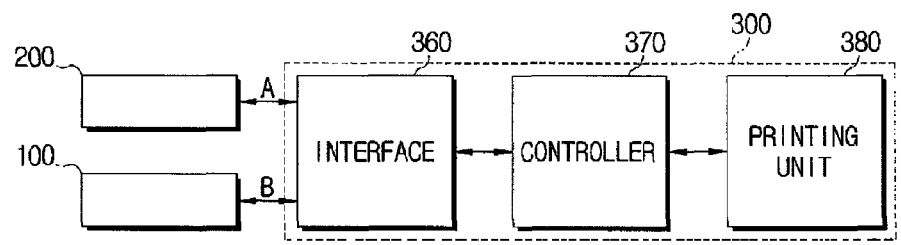
FIGS. 6A and 6B are a view illustrating a printing control system according to an embodiment of the present general inventive concept.
Figure 6B:
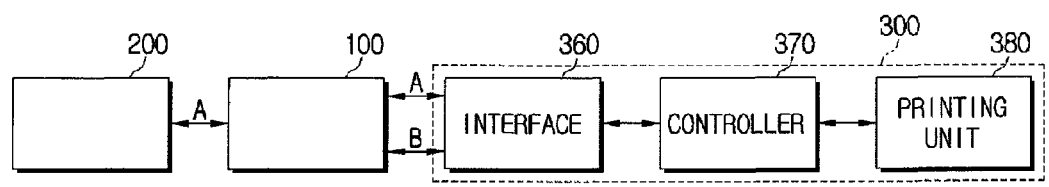

As illustrated in FIG. 6A, the printing apparatus 300 may include an interface 360, a controller 270, and a printing unit 380. The interface 360 may be connected to a printing control apparatus 100 and a web server 200 to receive printing data B and environmental information A, respectively, so that the controller 370 can control the printing unit 380 to print an image corresponding to the printing data B according to the received environmental information A. As illustrated in FIG. 6B, the interface 360 may connected to the printing control apparatus 100 to receive the printing data B and the environmental information A. It is possible that when the printing control apparatus 100 receives the environmental information B from the web server 200, the printing control apparatus 100 may generate a signal A1 generated according to the received environmental information A and a reference, and output the signal A1 together with the printing data B, so that the controller 370 can control the printing unit 380 to print an image according to the printing data B and the signal A1.

Figure 3:
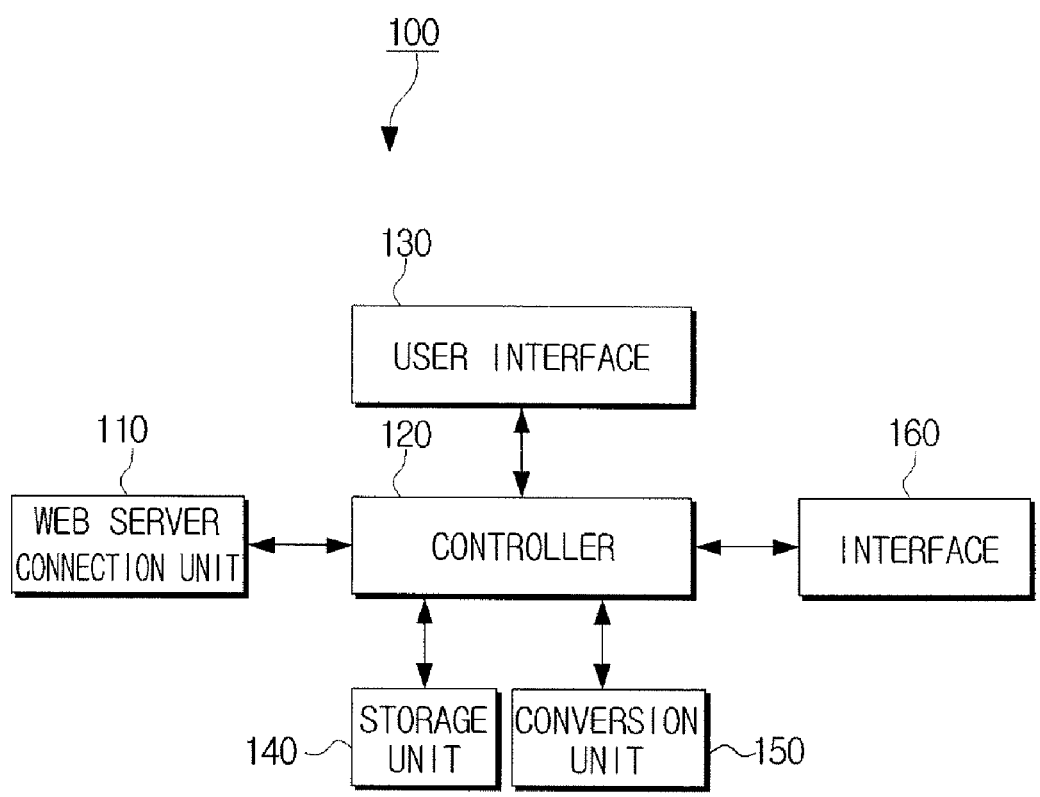
FIG. 3 is a block diagram illustrating the printing control apparatus of FIGS. 1 and 2.

FIG. 3 is a block diagram illustrating the printing control apparatus of FIG. 2. Referring to FIGS. 2 and 3, the printing control apparatus 100 comprises the web server connection unit 110, a user interface 130, a storage unit 140, a conversion unit 150, an interface 160, and the controller 120.

The web-server connection unit 110 connects the web server through the Internet.

The user interface 130 sets a web server address and area information. More specifically, the user interface 130 provides a user interface window containing a setup area, and a user inputs a web server address and information on the area where the printing apparatus 300 is located through the user interface 130. A uniform resource locator (URL) corresponding to a homepage of a weather center or of an area office may be set as the web server address. Also, if the homepage of the manufacturer of the printing apparatus 300 provides the environmental information, the web server address of the manufacturer may be set. The area information may be national or local information. The user can set the national or local information in a text format or a code format. The web server address and the area information are set by the user when the area of the printing apparatus 300 is changed. Also, the web server address and the area information are not necessarily set by the user, and the default is set in a driver at the time of manufacturing the printing apparatus 300 in consideration of the area where the printing apparatus 300 is to be located (for example, exporting country).

Figure 7:
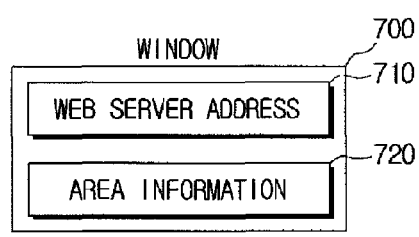
FIG. 7 is a view illustrating a window generated in a printing control system to select a web-server address and area information according to an embodiment of the present general inventive concept.

As illustrated in FIG. 7, the controller 120 controls the user interface 130 to generate a window 700 including a web server address section 710 and an area information section 720 to be displayed on a screen of a display device which can be connected to the controller 120. A web server address can be input through the web server address section 710 or can be selected from a list of one or more addresses included in the web server address section 710. Area information where the printing apparatus 300 is located or operated can be input through the area information section 720 or can be selected from a list of one or more area information included in the area information section 720. It is possible that the web server address can be automatically selected according to the area information when the web server addresses correspond to the respective area information. Accordingly, the printing control apparatus 100 is connected to the web server 100 according to the web server address and receives environmental information from the web server 100 according to the area information.

The storage unit 140 stores the web server address and the area information set though the user interface 130.

Upon the receipt of a printing signal about data, the conversion unit 150 converts the printing signal into printing data suitable for being processed by the printing apparatus 300.

The interface 160 communicates with the printing apparatus 300 to transmit the printing data and signals relating to the printing operation to the printing apparatus 300.

The controller 120 controls the entire operation of the printing control apparatus 100. More specifically, if the printing signal about data is received, the controller 120 reads out the web server address and the area information from the storage unit 140. After that, the controller 120 controls the web server connection unit 110 to connect the web server address, to provide the area information to the web server, and to request environmental information corresponding to the area information. If the environmental information is received through the web server by the above-described process, the controller 120 compares the received environmental information with the pre-set environmental information.

More specifically, the controller 120 determines whether the received environmental information is within an error range of the pre-set environmental information or not. If the received environmental information is determined to be within the error range of the pre-set environmental information, the controller 120 transmits a pre-set printing control signal, that is, a pre-set transfer voltage control signal, to the printing apparatus 300.

If the received environmental information is not determined to be within the error range of the pre-set environmental information, the controller 120 adjusts the transfer voltage control signal and transmits it to the printing apparatus 300. More specifically, if the received environmental information is less than a minimum value of the pre-set environmental information within the error range, the controller 120 increases a level of the pre-set transfer voltage control signal and transmits it to the printing apparatus 300. If the received environmental information is larger than a maximum value of the pre-set environmental information within the error range, the controller 120 decreases a level of the pre-set transfer voltage control signal and transmits it to the printing apparatus 300. In this case, the environmental information may be one of temperature information, pressure information, and altitude information.

Also, if the received environmental information is less than a minimum value of the pre-set environmental information within the error range, the controller 120 decreases a level of the pre-set transfer voltage control signal and transmits it to the printing apparatus 300. If the received environmental information is larger than a maximum value of the pre-set environmental information within the error range, the controller 120 increases a level of the pre-set transfer voltage control signal and transmits it to the printing apparatus 300. In this case, the environmental information may be humidity information.

When the printing apparatus 300 is an electro-photographic image forming apparatus, a control signal of the printing control apparatus 100 is the pre-set transfer voltage control signal or the adjusted transfer voltage control signal to control a printing operation (an image forming operation, an image developing operation, or image transferring operation) of a printing unit of the electro-photographic image forming apparatus. When the printing apparatus 300 is an ink-jet image forming apparatus, the control signal of the printing control apparatus 100 is a signal to control a printing operation or a maintenance operation of an inkjet printing unit of the electro-photographic image forming apparatus.

As described above, the controller 120 obtains the environmental information through the web server 200 in real time whenever receiving the printing signal, and adjusts the transfer voltage control signal according to the environmental information. The transfer voltage is a factor supplied to or used in the printing unit of the printing apparatus 300 to form an image on a printing medium.

Also, the controller 120 may connect with the pre-set web server 200 and obtain the environmental information at the time that the power of the printing control apparatus 100 is turned on. In this case, the controller 120 obtains time environmental information on the corresponding date and stores it to the storage unit 140. After that, if the printing signal is received, the controller 120 checks time information through an operating system (OS), then reads out the environmental information corresponding to the checked time, and adjusts the transfer voltage control signal according to the read environmental information. Also, the controller may connect with the pre-set web server 200 and obtain the environmental information at the time that the printer driver initializes its operation, or periodically (for example, per 2 hours). That is, the controller 120 connects with the web server and obtains the environmental information in at least one of cases where the printing signal is received, where the booting is performed, where the printer driver is executed, and where the pre-set time arrives.

The controller 120 controls the interface 160 to allow the printing data converted by the conversion unit 150 to be transmitted to the printing apparatus 300 along with the transfer voltage control signal.

If the printing apparatus 300 receives the transfer voltage control signal and the printing data from the printing control apparatus 100, it adjusts a transfer voltage according to the transfer voltage control signal and prints the printing data. Accordingly, the printing apparatus 300 can flexibly adjust the transfer voltage according to the environmental information without requiring an extra sensor.

Figure 4:
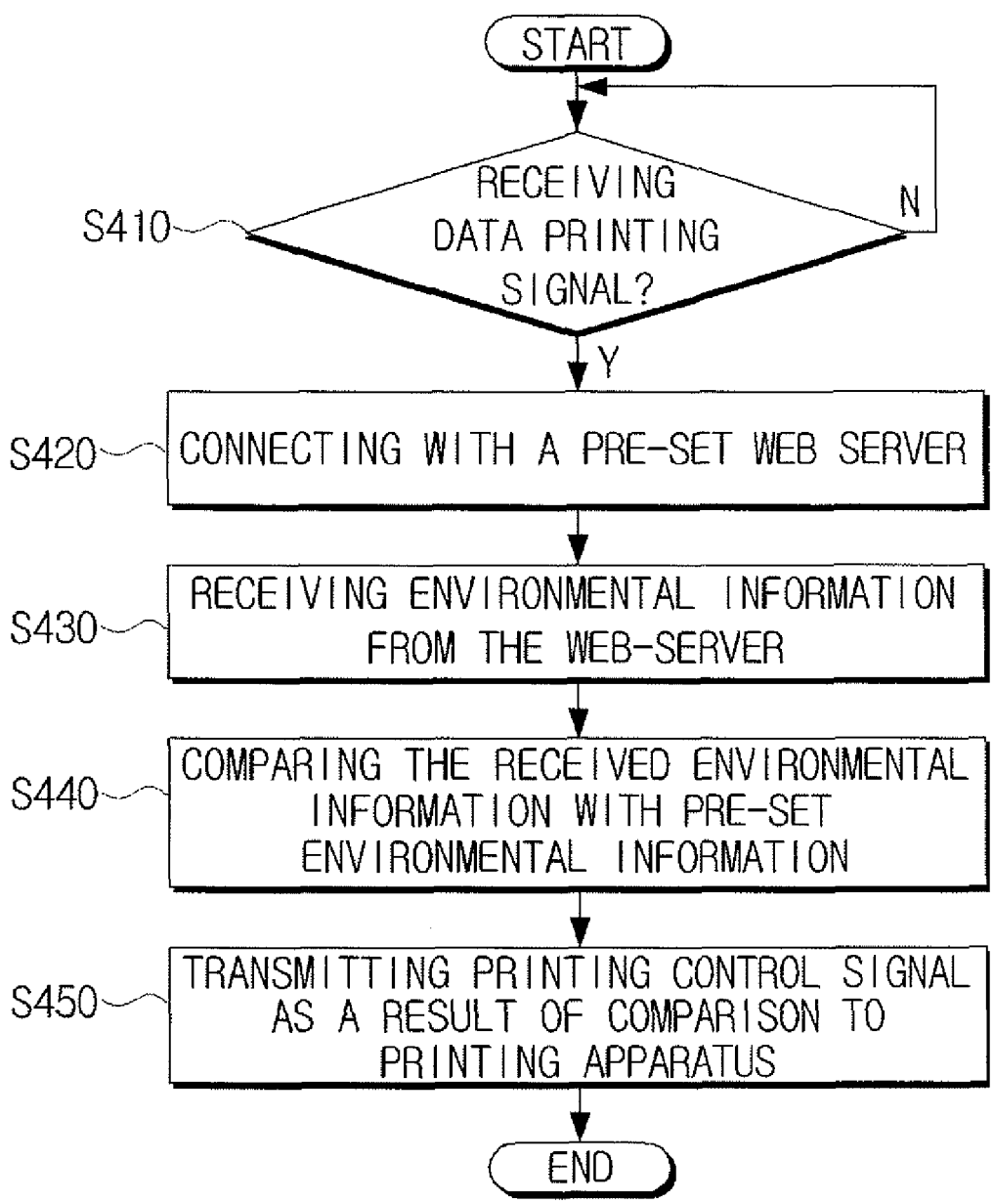
FIG. 4 is a flowchart illustrating a method of controlling a printing operation of a printing control apparatus according to the exemplary embodiment of the present general inventive concept.

FIG. 4 is a flowchart illustrating a method of controlling a printing operation of a printing control apparatus of a printing system according to the exemplary embodiment of the present general inventive concept. Referring to FIGS. 1 through 4, if the printing control apparatus 100 receives a printing signal about data at operation S410, the printing control apparatus 100 connects with the pre-set web server 200 and requests environmental information at operation S420.

Next, if the printing control apparatus 100 receives the environmental information through the web server 200 at operation S430, the printing control apparatus 100 compares the received environmental information with pre-set environmental information at operation S440.

Next, the printing control apparatus 100 transmits a printing control signal based on the result of comparison to the printing apparatus 300 at operation S450. The printing control signal may be a transfer voltage control signal to control a transfer voltage of the printing apparatus 300. The printing apparatus 300 controls the transfer voltage according to the transfer voltage control signal transmitted from the printing control apparatus 100, thereby improving the printing quality.

Figure 5:
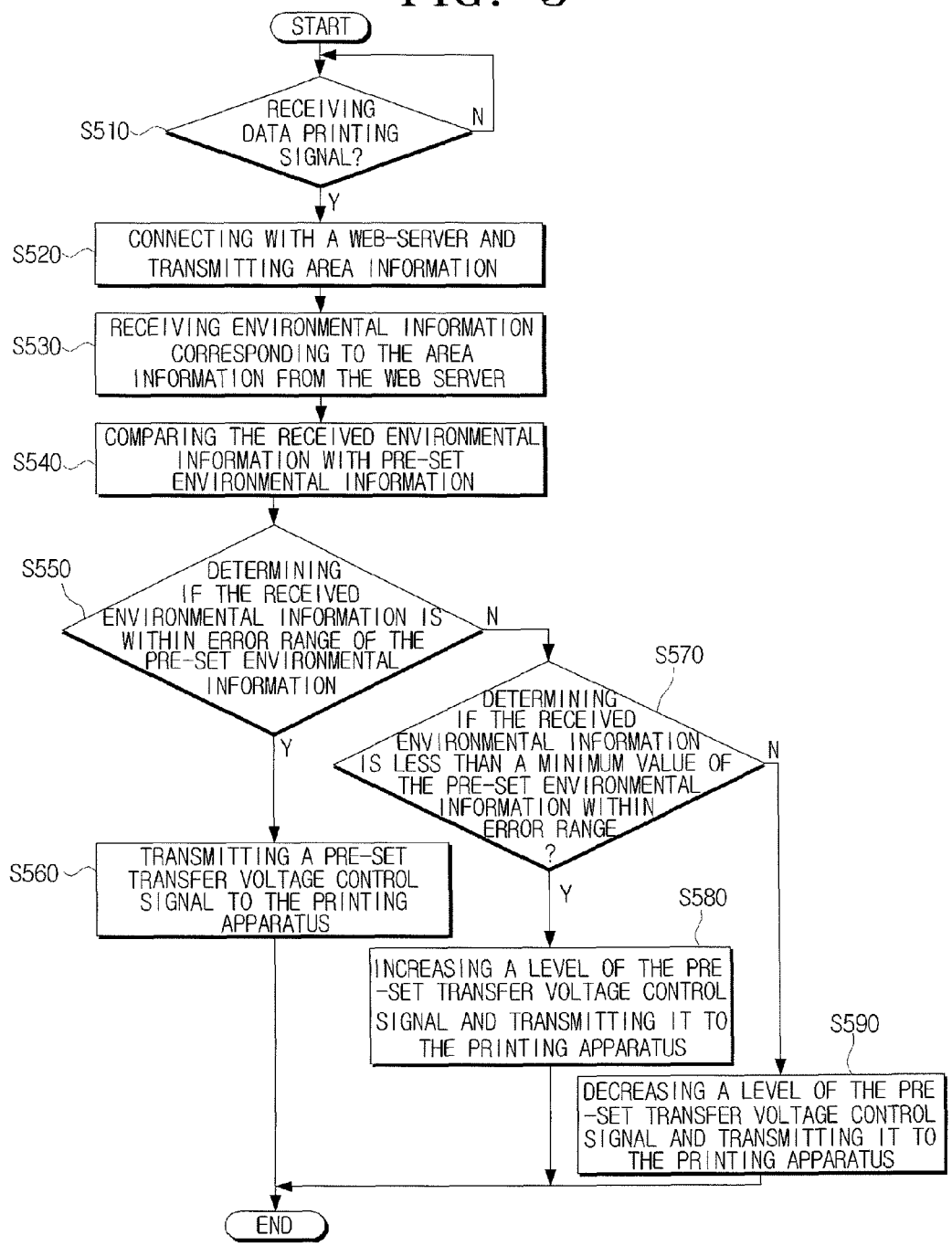
FIG. 5 is a flowchart illustrating the method of FIG. 4 in detail.

FIG. 5 is a flowchart illustrating a method of controlling a printing operation of a printing control apparatus of a printing system. Referring to FIGS. 1 through 5, if the printing control apparatus 100 receives a printing signal about data at operation S510, the printing control apparatus 100 connects with the web server 200, provides area information and requests environmental information at operation S520. The web server address and the area information are previously set and stored by a manufacturer or user.

Next, the printing control apparatus 100 receives the environmental information corresponding to the area information from the web server at operation S530.

After that, the printing control apparatus 100 compares the received environmental information with pre-set environmental information at operation S540. For example, if the received environmental information is about temperature, the received environmental information is compared with pre-set temperature information.

The printing control apparatus 100 determines if the received environmental information is within an error range of the pre-set environmental information. If the received environmental information is within an error range of the pre-set environmental information at operation S550 (Y), the printing control apparatus 100 transmits a pre-set transfer voltage control signal to the printing apparatus 300 at operation S560. If the received environmental information is within the error range of the pre-set environmental information, it does not significantly affect the printing quality and thus the pre-set transfer voltage control signal is transmitted to the printing apparatus 300.

Next, if the received environmental information is not within the error range of the pre-set environmental information at operation S550 (N), the printing control apparatus 100 determines if the received environmental information is less than a minimum value of the pre-set environmental information within the error range at operation S570. If the received environmental information is less than a minimum value of the pre-set environmental information within the error range at operation S570 (Y), the printing control apparatus 100 increases a level of the pre-set transfer voltage control signal and transmits it to the printing apparatus 300 at operation S580. In this case, the environmental information may be temperature, pressure or altitude which is a parameter that affect the printing quality when it changes. For example, if the pre-set environmental information is 30° C., if the error range is ±5° C., and if the received temperature information is 20° C., the printing control apparatus 100 determines that the received environmental information is less than the minimum value of the pre-set environmental information within the error range. In this case, the low temperature causes a developer not to be transferred onto the printing paper properly and thus it is necessary to increase a transfer voltage to be applied to a transferring unit. Accordingly, the printing control apparatus 100 increases a level of the transfer voltage control signal and transmits it to the printing apparatus 300.

On the other hand, if the received environmental information is larger than the maximum value of the pre-set environmental information within the error range at operation S570 (N), the printing control apparatus 100 decreases a level of the pre-set transfer voltage control signal and transmits it to the printing apparatus 300 at operation S590. For example, if the received temperature information is 40° C., it is determined to be larger than the maximum value of the pre-set environmental information within the error range. Therefore, the printing control apparatus 100 decreases a level of the transfer voltage control signal about the transfer voltage to be applied to the transferring unit and transmits it to the printing apparatus 300. The above description is merely about one example, and the pre-set temperature information and the error range can be varied according to environmental characteristics of the area where the printing apparatus 300 is located. Also, although the temperature information is used in the above by way of example, the same operation will be applied in the case of pressure and altitude.

If the environmental information is about humidity, the operations S580 and S590 are changed. That is, if the received environmental information is less than the minimum value of the pre-set environmental information within the error range at operation S570 (Y), the printing control apparatus 100 decreases a level of the pre-set transfer voltage control signal and transmits it to the printing apparatus 300. If the received environmental information is larger than the maximum value of the pre-set environmental information within the error range at operation S570 (N), the printing control apparatus 100 increases a level of the pre-set transfer voltage control signal and transmits it to the printing apparatus 300.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

According to the above-described method, the printing control apparatus 100 more easily obtains the environmental information of the printing apparatus 300, and flexibly controls the transfer voltage according to the environmental information.

As described above, according to the exemplary embodiments of the present general inventive concept, the transfer voltage control signal of the printing apparatus 300 is adjusted according to the environmental information of the area where the printing apparatus 300 is located, so that the effect of the environment on the printing quality can be minimized and thus the printing quality can be improved.

Also, since the environmental information is obtainable by connecting with the pre-set web server 200, there is no need for an extra sensor, and thus, a low price printing apparatus can be realized.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A printing control apparatus to be connected with a printing apparatus in an image forming system, comprising:
   a web server connection unit to connect with a web server of a pre-set address and receive environmental information of an area where the printing apparatus is located; and
   a controller to transmit a transfer voltage control signal of the printing apparatus, corresponding to the received environmental information and printing data, to the printing apparatus, by comparing the received environmental information with reference environmental information,
   wherein, if the received environmental information is not within an error range of the reference environmental information, the controller adjusts a pre-set transfer voltage control signal and transmits the adjusted transfer voltage control signal to the printing apparatus.

2. The printing control apparatus of claim 1, wherein the web server connection unit connects with the web-server when a printing signal is received, when a booting is performed, when a printer driver is executed, or when a pre-set time arrives.

3. The printing control apparatus of claim 1, wherein, if the received environmental information is within the error range of the reference environmental information, the controller transmits the pre-set transfer voltage control signal to the printing apparatus.

4. The printing control apparatus of claim 1, further comprising:
   a user interface to set a web server address and area information; and
   a storage unit to store the set web server address and the area information.

5. The printing control apparatus of claim 1, wherein the environmental information is one of temperature information, humidity information, pressure information, and altitude information.

6. A method of controlling a printing operation of a printing control apparatus to be connected to a web server and a printing apparatus in an image forming system, the method comprising:
   receiving environmental information of an area where the printing apparatus is located by connecting with a web server of a pre-set address; and
   controlling a printing operation by transmitting a transfer voltage control signal of the printing apparatus corresponding to the received environmental information and printing data to the printing apparatus, by comparing the received environmental information with reference environmental information,
   wherein if the received environmental information is not within an error range of the reference environmental information, the controlling further comprises adjusting a pre-set transfer voltage control signal and transmitting the adjusted the transfer voltage control signal to the printing apparatus.

7. The method of claim 6, wherein receiving environmental information comprises connecting with the web server when a printing control signal is received, when a booting is performed, when a printer driver is executed, or when a pre-set time arrives.

8. The method of claim 6, wherein if the received environmental information is within the error range of the reference environmental information, the controlling comprises transmitting the pre-set transfer voltage control signal to the printing apparatus.

9. The method of claim 6, wherein receiving environmental information comprises:
   setting a web server address and area information; and
   storing the set web server address and the area information.

10. The method of claim 6, wherein the environmental information is one of temperature information, humidity information, pressure information and altitude information.

11. A printing control system, comprising;
    a web server;
    a printing apparatus to perform a printing operation; and
    a printing control apparatus to receive environmental information about an area where the printing apparatus is located by connecting with the web server, and to control a printing operation by transmitting a printing control signal corresponding to the received environmental information and printing data to the printing apparatus, by comparing the received environmental information with reference environmental information,
    wherein, if the received environmental information is not within an error range of the reference environmental information, the controller adjusts a pre-set transfer voltage control signal and transmits the adjusted transfer voltage control signal to the printing apparatus.

12. A printing control system comprising:
    a printing control apparatus having a controller to select a web server address and area information, to connect with a web server according to the web server address section, to receive environmental information on the area information, to compare the received environmental information with reference environmental information, and to output printing data and a control signal corresponding the comparison; and
    a printing apparatus to receive the printing data and the control signal corresponding to environmental information, and to perform a printing operation to form an image on a printing medium according to the printing data and the control signal,
    wherein, if the received environmental information is not within an error range of the reference environmental information, the controller adjusts the control signal and transmits the adjusted control signal to the printing apparatus, in place of the control signal.

* * * * *